United States Patent [19]

Knoll et al.

[11] 3,895,359

[45] July 15, 1975

[54] STORAGE MATRIX CONSTRUCTION

[75] Inventors: Rudolf Knoll, Allmannshausen; Ludwig Harrer, Munich, both of Germany

[73] Assignee: Siemens Aktiengesellschaft, Berlin and Munich, Germany

[22] Filed: Apr. 15, 1974

[21] Appl. No.: 461,145

Related U.S. Application Data

[63] Continuation of Ser. No. 184,554, Sept. 21, 1971, abandoned.

[52] U.S. Cl.. 340/173 R; 340/174 M; 340/174 MA; 340/174 NC

[51] Int. Cl. ........................ G11c 5/06; G11c 11/06

[58] Field of Search. 340/174 MA, 174 NC, 174 M, 340/173 R, 166 C

[56] References Cited

UNITED STATES PATENTS 3,328,781 6/1967 Robey, Jr. et al. .......... 340/174 MA 3,588,852 6/1971 McCormack et al........ 340/174 MA

*Primary Examiner*—Stanley M. Urynowicz, Jr.

[57] ABSTRACT

A storage matrix is described in which the matrices are constructed on carrier plates. The matrices are combined into a storage block with the electrical conductors of different matrices being connected to each other by rows and columns. The carrier plates have a connection zone with openings, the openings of adjacent carrier plates being in alignment. The ends of the conductors forming the matrices are connected through these openings, and these ends form wiring points along with printed circuit conductors. The wiring points on the various carrier plates are interconnected by wire conductors.

7 Claims, 2 Drawing Figures

STORAGE MATRIX CONSTRUCTION

This is a continuation of application Ser. No. 184,554, filed Sept. 21, 1971, now abandoned.

BACKGROUND OF THE INVENTION

This invention is related to a storage arrangement in which several plate-shaped storage matrices, each containing crossed electrical conductors arranged in rows and columns and attached to at least one carrier plate, are combined into a unitary storage block, and in particular, such a storage arrangement in which the electric conductors of different matrices running in the direction of columns and/or rows are electrically connected with each other. Storage arrangements of this type are particularly useful in telecommunication installations.

In such storage arrangements the ends of electrical conductors of a matrix should be connectable with those of another matrix of the same storage block, but should also simultaneously be connectable, for example, with a plug connector over which for, example, a connection to a further storage block can be established. Further, during and after the assembly of the storage block a functional test by means of testing adapters must be possible.

To fulfill these requirements a conventional form of construction is to build a storage matrix of two carrier plates and to build a storage block of two storage matrices, whereby respectively, for example, the column wires of the two inner and of the two outer carrier plates of the two matrices are connected with each other. The connection is established by means of connector sockets with connection plugs attached to the carrier plates. In the two inner carrier plates these connection plugs are bent toward each other and welded or soldered. In the outer carrier plates the connection plugs remain upright. In between them solder-connections are inserted, which cover the inner connection plugs. Because of this, the inner connection plugs are not accessible for a further connection proceeding from the storage block. For this reason there are connection sockets with contact plugs also on the opposite sides of the carrier plates. At these contact plugs, on both sides of the carrier plates, a connection for the inner connection and the succeeding one for the connection leading to the outside are used alternatingly. These are established through wire connections, which are soldered to the corresponding connection plugs and lead to the connector sockets.

With the storage element construction the soldering of the wire connections is very complicated and expensive and offers the danger of erroneous contacts. Further, the connection plugs, which must be bent, can deviate very easily making the whole unit worthless. Since only every second connection plug can be used for the inner or the outer connection, they lie very close together making not only the assembly, but also the subsequent test harder, because it is very difficult to perfectly contact a testing adapter with the easily bendable and closely situated connection plugs.

It is an object of the invention to provide a storage matrix construction in which, avoiding the aforementioned disadvantages, a structural simplification and a corresponding reduction in materials and manufacturing costs is achieved.

It is another object to provide a storage structure meeting the foregoing object and in which testing by means of universal testing adapters is possible.

SUMMARY OF THE INVENTION

These and other objects are achieved by a structure in which the carrier plates have a connection zone with openings for the extension of the electrical conductors to be connected, which openings are aligned with the corresponding openings of the other carrier plates and are built partially as wiring or connection points connected with the ends of the electrical conductors. These connection points are connected with the accompanying connection points of the other carrier plates.

Through the creation of a connection zone with the printed conduction paths and the wiring points all connections can be established in a simple manner. For the connections to the outside, the connector plug contacts can be placed directly on the carrier plates and connected with the ends of the electrical conductors by means of printed conduction paths. This eliminates the connections leading to the outside. By extending the wire connections through the carrier plates a simple and easily executed direct connection between the carrier plates is established. Thus, the additional connector contacts for the inner connection of the carrier plates of a storage block are eliminated, and therewith also, is eliminated the dangerous bending of the connection plugs, as well as the difficult manual soldering of wire connections between the connector contacts. Various connections can be completed on one side of the carrier plates, since the inner connections do not hinder those leading to the outside, thereby reducing the cost of construction. Further, the testing of the separate units of a storage block before the final assembly is simplified. The wiring points of a carrier plate can be contacted with a testing adapter, as used for the testing of conductor plates. With the invention, therefore, above all the total expenditure for manual labor is substantially reduced, and through the creation of the connection zone with the printed conductor paths, the production of the total storage block approaches the technique typical of that with conductor plates.

In accordance with an advantageous embodiment of the invention, the connection points are arranged in more than one row, whereby the spaces between the connections lying in a row are enlarged.

In accordance with a further embodiment of the invention, the connection points are constructed as soldering eyes, and this simplifies the connection between the printed conductor paths and the wire conductors which are extended through the carrier plates.

The invention further contemplates attaching the printed conductor paths to both sides of the carrier plate, whereby the spaces between the separate conductor paths are enlarged.

According to the principles of the invention, the wire conductors have a thickening at one end, the largest thickness of which is larger than the diameter of the openings in the carrier plates. These thickenings prevent an undesired slipping through the openings in the carrier plates of the wire conductors and facilitate thereby the solderings of the wire terminal points. The wire terminal points pass through the openings of the carrier plates lying between two connection points, which are to be connected. This makes possible the connection of carrier plates, between which there are other carrier plates.

Between the carrier plates in the region of the connection points guidance protrusions are provided with guidance holes for the wire terminal points placed according to the distribution of the wiring points. The guidance protrusions facilitate the insertion of the wire terminal points and can serve simultaneously as interval-pieces for the carrier plates. Also, they protect the carrier plates with the electrical conductors from becoming soiled.

A storage block, according to the invention, comprises two matrices, and a matrix is formed by two carrier plates. Because of this arrangement, the soldering connections can be completed on the outer carrier plates of a storage block. A soldering eye, which lies on the carrier plate of a matrix turned toward the inner side of the block and is to be connected with the other matrix, is connected over an inserted wire piece with a double soldering eye of the outer carrier plate, and the latter is connected over a further wire piece with a soldering eye on the outer carrier plate of the other matrix. It is, thus, achieved that the wire pieces can be soldered in between the two carrier plates of the separate matrices before the final assembly of the storage block, whereby the wiring points of the inner carrier plates are connected with the double soldering eyes lying on the outer carrier plates. After the assembly of the matrices, just as with the connection of wiring points of the two outer carrier plates, these double soldering eyes can be connected with each other through inserted wire terminal points.

BRIEF DESCRIPTION OF THE DRAWINGS

The invention will be best understood by reference to a description of a preferred embodiment given hereinbelow in conjunction with the drawings in which.

DETAILED DESCRIPTION OF THE DRAWINGS

Figures 1, 2:
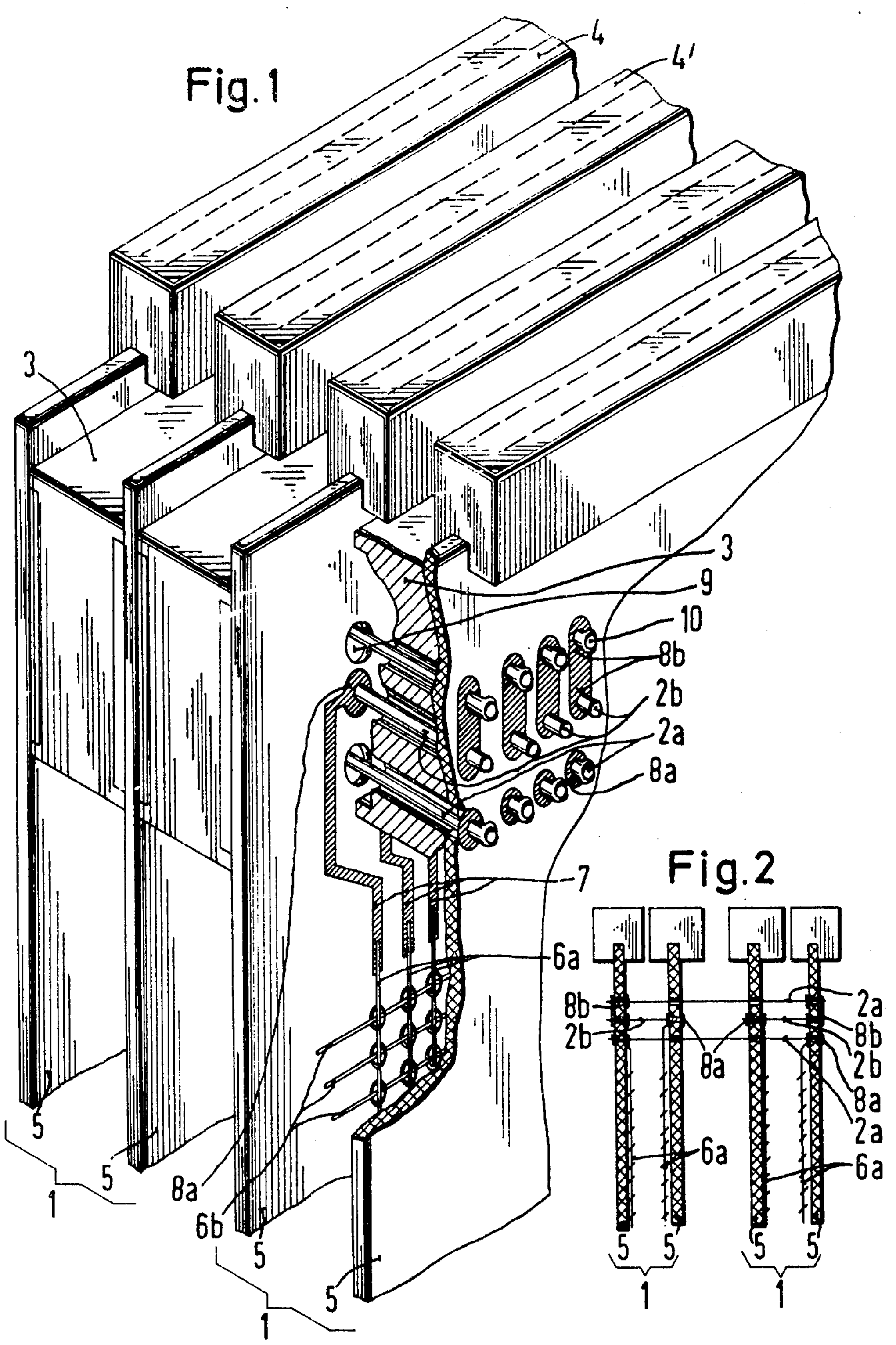
FIG. 1 is a perspective representation of a storage block according to the invention and FIG. 2 is a schematic cross-sectional representation through the storage block according to FIG. 1 in smaller scale.

FIG. 1 is a perspective representation of a part of a storage block according to the invention, consisting of the storage matrices 1, the wire conductors 2*a* and 2*b*, the guidance blocks 3 and the plug connector blocks 4. The storage matrices are constituted by carrier plates 5, which contain crossing electrical conductors 6*a* and 6*b*, as well as a connection zone with printed conductor paths 7, wiring points 8 arranged in more than one row and form as soldering eyes and openings 9. The connection zone lies in the extension of the electrical conductor 6*a* to be connected and has openings 9, which align with the corresponding openings 9 of the other carrier plates 5 and the connection zones are constructed partially as wiring points 8. The printed conductor paths 7 connect the electrical conductor 6*a* with the wiring points 8 and the connector blocks 4, which are placed on the edge of the plate and enable a connection to further storage blocks.

To reduce the spacing intervals, the printed conductor paths 7 can be attached to both sides of the carrier plates 5. The wiring points 8 are connected by means of wire conductors 2 extending through the openings 9 with the accompanying wiring point 8 of the other carrier plates 5. The wire conductors are bare wire and have a thickening 10 on one end, which prevents an undesired slippage through the carrier plates 5.

Carrier plates 5, which lie between two wiring points 8 to be connected, have openings at the appropriate places, through which the connecting wire conductors 2 can penetrate unhindered. In the region of the wiring points 8 there are perforated guidance ridges between the carrier plates 5, whose guidance holes for the wires 2 are distributed according to the arrangement of the wiring points 8.

FIG. 2 shows schematically a cross-section through the storage block according to FIG. 1 in smaller scale. In this figure, it is easy to recognize that two carrier plates 5 are combined into one matrix 1, and two matrices 1 are combined into one storage block. The soldering eyes 8*a* of a matrix 1 lying on an inner carrier plate 5 are connected through the inserted wire terminal points 2*b* with the double soldering eyes 8*b* of the outer carrier plates 5, and those in turn are connected with each other through further wire terminal points 2*a*, whereby the whole connection between the soldering eyes 8*a* lying in the inside of the block is completed. The connection of the outer soldering eyes 8*a* proceeds through simple wire terminal points 2*a* which extend between carrier plates, whereby various electrical conductors 6*a* are connected with each other within a storage block.

This preferred embodiment of the invention described hereinabove is only exemplary of the principles of the invention and is not to be considered limiting as to its scope. The scope of the invention is defined by the appended claims.

We claim:

1. A storage matrix construction, comprising:

a plurality of matrices formed of crossed rows and columns of electrical conductors, a plurality of carrier plates having said matrices, respectively, attached to the surface thereof, said carrier plates being formed into a storage block, connection zones formed on and spaced from the periphery of said carrier plates as to be entirely within the interiors of said carrier plates, said connection zones including wiring points and means defining openings through said carrier plates, said openings on said carrier plates being aligned, printed circuit conductors extending said electrical conductors and forming said wiring points on said carrier plates, a wiring point being formed for each said electrical conductors on the carrier plate associated therewith and wire conductors connecting predetermined ones of said wiring points on different carrier plates through said openings.

2. The construction defined in claim 1, wherein the wiring points on each said carrier plate are arranged in rows, the rows of the various carrier plates differing in spatial location.

3. The construction defined in claim 1, wherein said wiring points are soldering eyes.

4. The construction defined in claim 1, wherein said printed conductors are formed on both surfaces of said carrier plates.

5. The construction defined in claim 1, wherein said wire conductors each have at least one thickened end, extending from said storage block, the diameter of said end being greater than the diameters of said openings.

6. The construction defined in claim 1, wherein a storage block is constituted by two of said matrices and a matrix is formed on two of said carrier plates.

7. The construction defined in claim 6, wherein said wiring points are formed as soldering eyes and wherein a soldering eye lying on an inner carrier plate and which is to be connected with another matrix is connected over a wire conductor to a soldering eye on an outer carrier plate, the latter soldering eye being connected over a wire conductor with a soldering eye on the outer carrier plate of said other matrix.

* * * * *